United States Patent Office  3,222,847
Patented Dec. 14, 1965

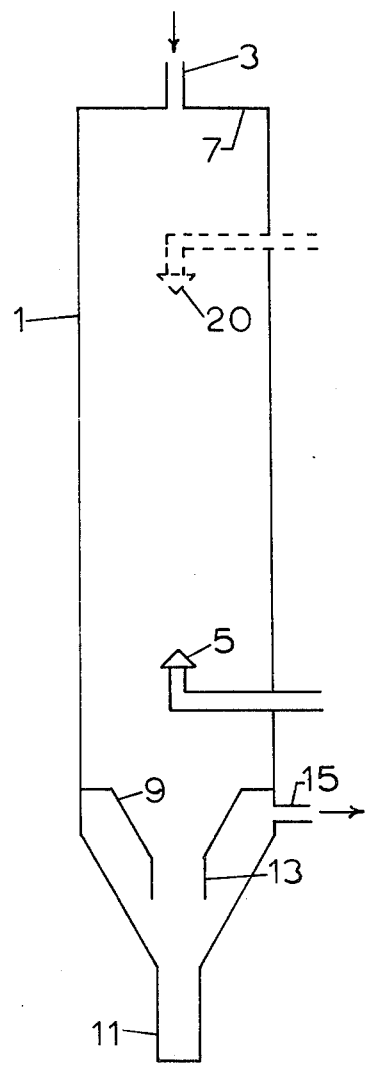

3,222,847
PROCESS OF SPRAYING AND COOLING
A GAS
Robert N. Secord, Wenham, and Charles B. Wendell, Canton, Mass., assignors to Cabot Corporation, Boston, Mass., a corporation of Delaware
Filed Sept. 5, 1963, Ser. No. 306,856
3 Claims. (Cl. 55—71)

This invention relates to solid-gas phase reactions and more particularly to an improved process for the production of metal and metalloid halides.

Many processes of commercial importance, such as the halogenation of metal and metalloid oxides, carbonylation of metal oxides and the production of carbon tetrachloride, ammonia and hydrogen cyanide are achieved by flowing reactant gases through a particulate solid, said solid acting as a co-reactant, catalyst or support. The effluent gases containing the product from the reactor are normally processed downstream in order to remove adventitious impurities and to convert the product into the more easily handled liquid form. For instance, silicon tetrachloride is generally commercially produced by flowing chlorine gas at high temperature through a fixed, moving or fluidized bed, of silica and carbon and/or silicon carbide. The following equations are believed to correctly illustrate the reactions involved wherein in Equation 1, silica and carbon, and in Equation 2, silicon carbide serve as the solid co-reactants:

(1) $$SiO_2 + C + 2Cl_2 \xrightarrow{heat} SiCl_4 + \tfrac{1}{2}CO_2$$

(2) $$SiC + 2Cl_2 \longrightarrow SiCl_4 + C$$

Quite often the reactions represented by Equations 1 and 2 are affected simultaneously in order that the heat generated by the relatively exothermic reaction of Equation 2 can be utilized in the activation and maintenance of the non-self-sustaining reaction of Equation 1. While both said reactions are believed to proceed most efficiently at temperatures of between about 2500° F. and about 3000° F. or more, the effluent silicon tetrachloride product gases from the reactor are normally cooled to below the boiling point of silicon tetrachloride, i.e. below about 135° F., in order to convert the product to the liquid state. Cooling of the gases and partial removal of entrained solids is often accomplished in a tower-type scrubber by spraying the gas stream vertically downwardly or horizontally with a quantity of previously recovered liquid product. A serious disadvantage in this method of cooling and solids removal resides in the fact that in order for the scrubbing spray to be maintained in contact with the hot gases for a sufficiently long period of time to accomplish effective cooling and/or solids removal, the tower must normally be of considerable length. Moreover, in many cases, the hot gases entering said tower flow over and around at least part of the spraying equipment, such as nozzles, etc. Thus, without elaborate and expensive precautions, overheating, burning and even fusion of said equipment often occurs, thereby deleteriously affecting and, in many instances, completely blocking the scrubbing spray. In accordance with the present invention, however, these problems have either been solved or substantially alleviated.

Accordingly, it is a principal object of the present invention to provide an improved scrubber.

It is another object of the present invention to provide a novel method for cooling hot reactor effluent gases.

It is a further object of the present invention to provide a novel method for the concomitant cooling of gaseous reactor effluents and removal of entrained solids therefrom.

Other objects of the present invention will in part be obvious and will in part appear hereinafter.

The above and other objects and advantages of the present invention will be more readily understood when reference is had to the accompanying drawing forming a part hereof, wherein there is illustrated a schematic diagrammatic representation of an embodiment of the present invention, i.e. a tower wherein countercurrent spraying of downwardly moving gases is accomplished.

Referring now to the drawing, reactor effluent gases enter tower 1 through entry 3 and course downwardly through said tower. Cooling and removal of particulate solids from said gases is accomplished by spraying a liquid into the tower through nozzle 5. The droplets of spray rise to an apex located somewhere below wall 7 and subsequently fall the length of the tower. Thus, the residence time of said droplets within the tower is substantially increased over cooling methods comprising downwardly directed sprays. Moreover, in accordance with the present invention, the temperature and volume of the droplets sprayed through nozzle 5 is adjusted so that the heat transferred to the droplets from the reactor effluent gases entering through conduit 3 is sufficient to raise the temperature of said droplets above their boiling point. Accordingly, prior to reaching the bottom of tower 1, said droplets have been totally converted to the gaseous phase while the gaseous reactor effluent entering from conduit 3 has been cooled to a considerable extent.

It was discovered, moreover, that the solid particles entrained in the reactor effluent are agglomerated by the droplets of spray prior to the conversion of said droplets to the gaseous state and that thereafter the action of gravity and the velocity imparted to said agglomerates by the downwardly flowing gas causes said agglomerates to pass through skirt 9 and collect in bin 11. The gases, however, i.e. the vaporized droplets and the effluent product gases, substantially freed of solid matter, follow a course around skirt rim 13 and exit from tower 1 via conduit 15. The solid material collected in bin 11 is, of course, periodically removed.

The materials from which the scrubber of the present invention (and the associated apparatus) can be fabricated are subject to considerable variation. However, it should be borne in mind that the materials and physical environment to which the said apparatus is subjected generally approximate to a substantial degree, the materials and temperatures created within the reaction zone wherein the effluent product gases are produced. Accordingly, it is generally feasible to utilize the same materials for the fabrication of the apparatus of the present invention as those utilized in the reactor wherein the effluent product gases are produced. For instance, the chlorination of silica is generally effected within a reactor comprising a carbon, graphite, stainless steel or ceramic lined metal shell; thus, a similar type of construction for the scrubber of the present invention is entirely satisfactory. To illustrate further, the production of ammonia by contacting nitrogen and hydrogen with an iron oxide catalyst is generally accomplished within a reactor fabricated from a stainless or chromium alloy steel. Again, the construction of the scrubber of the present invention from stainless or chromium alloy steel for said ammonia process is entirely suitable.

The design of the scrubber of the present invention is also subject to considerable variation. It should be noted, however, that in order to agglomerate the entrained solids as much as possible and to realize maximum cooling effects, contact between the effluent product gases and the vertically sprayed droplets should be maintained as long as is practicable. Hence, it is preferred that the linear velocity within tower 1 of the downwardly moving effluent gases be relatively low (i.e. less than about 5 ft./ sec.). Also, it is preferred that the height of the scrubber and of said spray be adjusted so as to avoid impingement of the droplets upon the internal wall of tower 1 and so that the spray engages the effluent gases immediately below wall 7 so that the droplets will remain as discrete droplets (i.e. unvaporized) for as long as possible during their residence time in tower 1. Thus, it is generally preferable that the height achieved by said spray be at least 80% of the total distance between nozzle 5 and wall 7.

The design of that portion of the scrubber wherein the gases pass through skirt 9 and thence exit through conduit 15 is critical in that the point of exit of said gases must be at least as high as the horizontal plane of skirt rim 13 and preferably substantially higher than said level so as to define a turn at least about 15° higher than said horizontal plane. Obviously, the greater the vertical distance between said skirt rim 13 and exit conduit 15, the smaller the probability of solids being carried through conduit 15.

A better understanding of the invention can be obtained from the following example which, however, should be construed as being illustrative in nature and as not limiting the scope of the invention:

*Example 1*

A graphite and carbon black insulated, cylindrical, stainless steel reactor having a 10 ft. O.D., a 15 ft. O.L.; a 5 ft. I.D. and a 4 ft. I.L. is preheated to about 1000° F. by passing silicon tetrachloride preheated to about 1800° F. therethrough. The silicon tetrachloride flow is then discontinued and there is introduced into the reaction zone 28 lbs./hr. silicon metal, 70 lbs./hr. chlorine and 650 lbs./hr. $SiCl_4$. The feed of silicon tetrachloride is gradually decreased until only about 100 lbs./hr. thereof is delivered to the reaction zone whereupon the reactor temperature increases to about 1900° F. Next, the flow of silicon metal is arrested and there is introduced into the reaction zone about 40 lbs./hr. of silicon carbide. The temperature of the reactor continues to increase and when the temperature reaches about 2500° F. the silicon carbide flow rate is decreased to about 30 lbs./hr. and there is introduced into the reactor a sand-carbon mixture comprising about 30% by weight of carbon at a rate of about 63 lbs./hr. After about 24 hours running time at the above conditions, the temperature within the reactor stabilizes at about 3100° F. and the flow rate and temperature of the effluent gases is determined to be about 20 s.f.t.³/min. and about 2900° F. respectively. At this point said effluent gases are fed into a scrubber of the type shown in FIGURE 1 comprising a ceramic lined stainless steel tower 12 ft. long by 4 ft. in diameter through conduit 3. Said cylinder is equipped with nozzle 20, (shown in FIGURE 1 in broken lines), said nozzle being a narrow angle spray nozzle "Model 3030 s.s." produced by Spraying Systems Inc., Bellwood, Illinois. Next, liquid silicon tetrachloride at temperatures of about 120° F. is pumped through nozzle 20 into tower 1 at a constant rate of about 1 gallon/minute which rate it is found is the maximum rate that can be utilized without the collection of liquid silicon tetrachloride in bin 11. The apparatus and reactor are then maintained at constant conditions and the average temperature of the gases exiting through conduit 15 is found to be about 1500° F.

After about 6 hours, shutdown is required due to severe corrosion and heat damage to spray nozzle 20. The solids collected in collection bin 11 are then weighed and it is found that in the 6 hour period of operation about 50 lbs. of solid materials are removed from a total of about 7500 s.f.t.³ of effluent gases.

At the end of the aforementioned 6 hour reaction period, the apparatus is adjusted to divert the flow of liquid $SiCl_4$ through nozzle 5 rather than nozzle 20, said nozzles being identical. The chlorination reaction is maintained at a constant rate while the rate at which liquid silicon tetrachloride is sprayed through nozzle 5 is increased to about 2 gallons/minute. The average temperature of the gases exiting through conduit 15 is found to be about 235° F. At the conclusion of a 24 hour period during which the above conditions are maintained the total solids collected in collection bin 11 are weighed and it is found that about 200 lbs. of solid materials have been removed from about 30,000 s.f.t.³ of effluent gases. Moreover, examination of the spray nozzle reveals that no damage thereto has occurred.

Obviously, many changes can be made in the above examples without departing from the scope of the present invention.

For instance, the effluent gases can be introduced tangentially into tower 1 in order to cause said gases to course downwardly in a spiral fashion. Furthermore, the liquid introduced through nozzle 5 can be heated to just below its boiling point, or cooled to just above its freezing point prior to introduction thereof through nozzle 5 by means of suitable temperature control apparatus. Also, obviously the spray need not issue from a single nozzle, as a plurality of nozzles set on one or more horizontal planes and directed upwardly can be utilized.

Accordingly, it is intended that the above disclosure be regarded as illustrative and as in no way limiting the scope of the invention.

What we claim is:

1. In the process of simultaneously cooling and removing entrained solids from a stream comprising a hot gaseous medium which process comprises contacting said gaseous medium with a volatile liquid spray in a cooling zone to agglomerate said solids while cooling said gaseous medium and evaporate said liquid the improvement which comprises introducing a spray of said liquid into the lower portion of said zone, said spray being directed upwardly into the upper portion of said zone and countercurrently to said stream thereby providing a relatively large contact time between said liquid and said medium.

2. In the process of simultaneously removing entrained solids from a stream comprising vapors of a metal halide while cooling said vapors which process comprises contacting said strean in a cooling zone with a spray of said metal halide in liquid form to agglomerate said solids and evaporate said liquid metal halide, the improvement which comprises introducing a spray of said metal halide in liquid form into the lower portion of said cooling zone, said spray being directed upwardly into the upper portion of said zone and countercurrently to said stream.

3. A process of claim 2 wherein said metal halide is silicon tetrachloride.

References Cited by the Examiner

UNITED STATES PATENTS

| | | | |
|---|---|---|---|
| 2,446,181 | 8/1948 | Kraus | 55—71 X |
| 2,514,529 | 7/1950 | Weber | 261—117 |
| 2,870,869 | 1/1959 | Mahler | 55—71 X |
| 2,953,218 | 9/1960 | Coates | 23—87 X |
| 3,140,163 | 7/1964 | Hausberg | 261—117 X |
| 3,163,498 | 12/1964 | Lisanki et al. | 261—117 |

REUBEN FRIEDMAN, *Primary Examiner.*

J. ADEE, *Assistant Examiner.*